(12) United States Patent
Ishida

(10) Patent No.: US 7,831,988 B2
(45) Date of Patent: Nov. 9, 2010

(54) SELECTING APPARATUS AND SELECTING METHOD

(75) Inventor: Masaki Ishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1106 days.

(21) Appl. No.: 10/964,629

(22) Filed: Oct. 15, 2004

(65) Prior Publication Data

US 2005/0088575 A1    Apr. 28, 2005

(30) Foreign Application Priority Data

Oct. 28, 2003    (JP) .............................. 2003-367317

(51) Int. Cl.
*G06F 3/00* (2006.01)
*G06F 13/00* (2006.01)
*H04N 5/445* (2006.01)

(52) U.S. Cl. .............................. 725/46; 725/48; 725/52; 725/131; 348/705; 348/731; 348/734

(58) Field of Classification Search ................. 725/143, 725/46–49, 52, 131; 348/705, 731, 734
See application file for complete search history.

(56) References Cited

U.S. PATENT DOCUMENTS

| | | | |
|---|---|---|---|
| 5,528,304 A | 6/1996 | Cherrick et al. | |
| 5,629,733 A | 5/1997 | Youman et al. | |
| 5,886,746 A | 3/1999 | Yuen et al. | |
| 6,133,910 A * | 10/2000 | Stinebruner | 725/49 |
| 6,359,580 B1 | 3/2002 | Morrison | |
| 6,473,135 B1 | 10/2002 | Iwamura | |
| 7,313,806 B1 * | 12/2007 | Williams et al. | 725/46 |
| 2002/0140871 A1 * | 10/2002 | Piotrowski et al. | 348/731 |
| 2003/0145321 A1 * | 7/2003 | Bates et al. | 725/25 |
| 2004/0046677 A1 * | 3/2004 | Dresti et al. | 340/825.57 |
| 2004/0087348 A1 * | 5/2004 | Desch | 455/566 |
| 2004/0123316 A1 * | 6/2004 | Kendall et al. | 725/37 |
| 2005/0166230 A1 * | 7/2005 | Gaydou et al. | 725/41 |

FOREIGN PATENT DOCUMENTS

| | | |
|---|---|---|
| EP | 0 477 754 A2 | 4/1992 |
| JP | 63-36608 | 2/1988 |
| JP | 2000-324412 | 11/2000 |
| JP | 2001-257610 | 9/2001 |
| JP | 2002-118794 | 4/2002 |
| JP | 2002-232795 | 8/2002 |
| JP | 2003-189199 | 7/2003 |
| WO | WO 03/092270 A1 | 11/2003 |

* cited by examiner

*Primary Examiner*—Andrew Y Koenig
*Assistant Examiner*—Ricky Chin
(74) *Attorney, Agent, or Firm*—Oblon, Spivak, McClelland, Maier & Neustadt, L.L.P.

(57) ABSTRACT

A selecting apparatus is disclosed which includes a selecting unit for selecting an input source from a plurality of sources, a switching unit for switching content data in the input source selected by the selecting unit, an operating unit made up of a plurality of operating elements constituting the single integral operating unit, and a controlling unit for controlling the switching unit to switch the content data if a predetermined operating element among the operating elements constituting the operating unit is operated, the controlling element further controlling the selecting unit to execute the input source selection if another predetermined operating element among the constituting elements is operated.

12 Claims, 5 Drawing Sheets

FIG. 2

| DISPLAY CHANNEL | RECEIVING CHANNEL | CHANNEL SKIP |
|---|---|---|
| 1 | 1 | 0 |
| 2 |  | 1 |
| 3 | 3 | 1 |
| 4 | 4 | 0 |
| 5 |  | 1 |
| 6 | 6 | 0 |
| 7 |  | 1 |
| ⋮ | ⋮ | ⋮ |

FIG. 3

| DISPLAY CHANNEL | RECEIVING CHANNEL | CHANNEL SKIP |
|---|---|---|
| 101 | 101 | 0 |
| 102 | 102 | 0 |
| 103 | 103 | 0 |
| 104 | 104 | 0 |
| 105 | 105 | 0 |
| ⋮ | ⋮ | ⋮ |

FIG. 4

| TUNER ID | RECEIVED BROADCAST WAVE | DEVICE | TUNER SKIP |
|---|---|---|---|
| 0 | 0 (TERRESTRIAL WAVE) | 0 (INSIDE) |  |
| 1 | 1 (BS BROADCAST WAVE) | 0 (INSIDE) | 0 |
| 2 | 2 (CS BROADCAST WAVE) | 1 (OUTSIDE) | 0 |

SELECTING APPARATUS AND SELECTING METHOD

BACKGROUND OF THE INVENTION

The present invention relates to a selecting apparatus and a selecting method adapted for use with a receiving apparatus capable of receiving content data from a plurality of sources.

A user of a receiving apparatus capable of receiving TV broadcasts may sometimes switch channels randomly in what is known as zapping before deciding on a particular channel that attracts the user's interest. The zapping operation is typically executed by the user manipulating a channel selection key.

If the receiving apparatus is compatible only with a single category of broadcast wave, zapping is performed conventionally by use of a single channel selecting element making up part of the channel selection key.

In recent years, the terrestrial wave analog broadcasts have been supplemented with BS (broadcast satellite) and CS (communication satellite) broadcasts gaining widespread acceptance. The additional categories of broadcast waves are addressed by the increasingly popularized use of receiving apparatuses each having a plurality of tuners for receiving the newly introduced broadcast waves. With these receiving apparatuses, zapping within one category of broadcast wave is done using the same single operating element as before. However, zapping across different categories of broadcast waves requires operating an additional element or elements for the switching.

The additional operation on the elements for changing broadcast wave categories translates into increased burdens on the user. That is, the user cannot perform zapping across different broadcast wave categories as easily as within the same wave category.

A solution to the disadvantage above is proposed by some of the multiple-wave-category receiving apparatuses resorting to the channel selection key alone for zapping. These apparatuses are arranged to switch channels starting from the first or the last channel within the currently selected wave category before moving on to channels of another broadcast wave category. In other words, the channels across different categories of broadcast waves are chained sequentially so that the channel selection key alone may be operated to zap channels across different wave categories. Some relevant aspects of the related art are discussed illustratively in Japanese Patent Laid-open No. 2000-324412.

However, the proposed solution above requires zapping through all channels within the currently selected broadcast wave category before reaching any one channel of another broadcast wave category. As the number of receivable channels is increasing today along with the number of broadcast wave categories, the number of times the channel selection key needs to be operated conventionally for zapping can become inordinately large.

SUMMARY OF THE INVENTION

The present invention has been made in view of the above circumstances and provides, according to one aspect of the invention, a selecting apparatus including: a selecting unit for selecting an input source from a plurality of sources; a switching unit for switching content data in the input source selected by the selecting unit; an operating unit made up of a plurality of operating elements constituting the single integral operating unit; and a controlling unit for controlling the switching unit to switch the content data if a predetermined operating element among the operating elements constituting the operating unit is operated, the controlling element further controlling the selecting unit to execute the input source selection if another predetermined operating element among the constituting elements is operated.

According to another aspect of the invention, there is provided a selecting method including the steps of: selecting an input source from a plurality of sources; switching content data in the input source selected in the selecting step; and controlling the switching step to switch the content data if a predetermined operating element among a plurality of operating elements constituting a single integral operating unit is operated, the controlling step further controlling the selecting step to execute the input source selection if another predetermined operating element among the plurality of operating elements is operated.

Where the inventive apparatus and method outlined above are in use, content data in the input source is switched if a predetermined operating element among a plurality of operating elements constituting the single integral operating unit is operated. The input source selection is executed if another predetermined operating element among the plurality of operating elements is operated. It follows that the single integral operating unit alone may be used both to select the input source and to switch the content data in the input source.

If the plurality of sources constitute a plurality of categories of broadcast waves representative of different television broadcasts and if the content data is formed by broadcast data from each of a plurality of television broadcast channels, then the operating unit alone may be used to switch broadcast channels as well as to select a desired broadcast wave category (i.e., tuner).

If the operating unit is an arrow key designed to give specific commands when operated in the upward, downward, leftward, or rightward direction, then the arrow key may be operated illustratively upward or downward to switch broadcast channels and leftward or rightward to select the broadcast wave category. In other words, the single integral operating unit alone may be used to carry out zapping involving both the switching of channels and the selection of broadcast wave categories.

With zapping executed using the single operating unit for both channel switchover and broadcast wave selection, it is possible to implement a user interface that is appreciably easier to use than before, especially when the selection of a desired broadcast wave category is involved.

The inventive arrangements above enable the user to change input sources without running through all content data within the currently selected input source (i.e., through all broadcast channels within the same broadcast wave category). This feature eliminates the need for going through unnecessary channel switching operations before getting to the selection of a broadcast wave category, as has been the case with conventional arrangements. The new scheme translates into a significant reduction in the number of times zapping needs to be performed across different broadcast wave categories (i.e., different sources) before a desired channel is reached.

Other objects, features and advantages of the invention will become more apparent upon a reading of the following description and appended drawings.

BRIEF DESCRIPTION OF THE DRAWINGS

FIG. 2 is a tabular view depicting a typical data structure of a channel setting table held in the selecting apparatus according to the invention;

FIG. 3 is a tabular view giving another data structure of the channel setting table stored in the selecting apparatus of the invention;

FIG. 4 is a tabular view indicating a typical data structure of a tuner setting table held in the inventive selecting apparatus;

DESCRIPTION OF THE PREFERRED EMBODIMENTS

Preferred embodiments of this invention will now be described with reference to the accompanying drawings.

Figure 1:
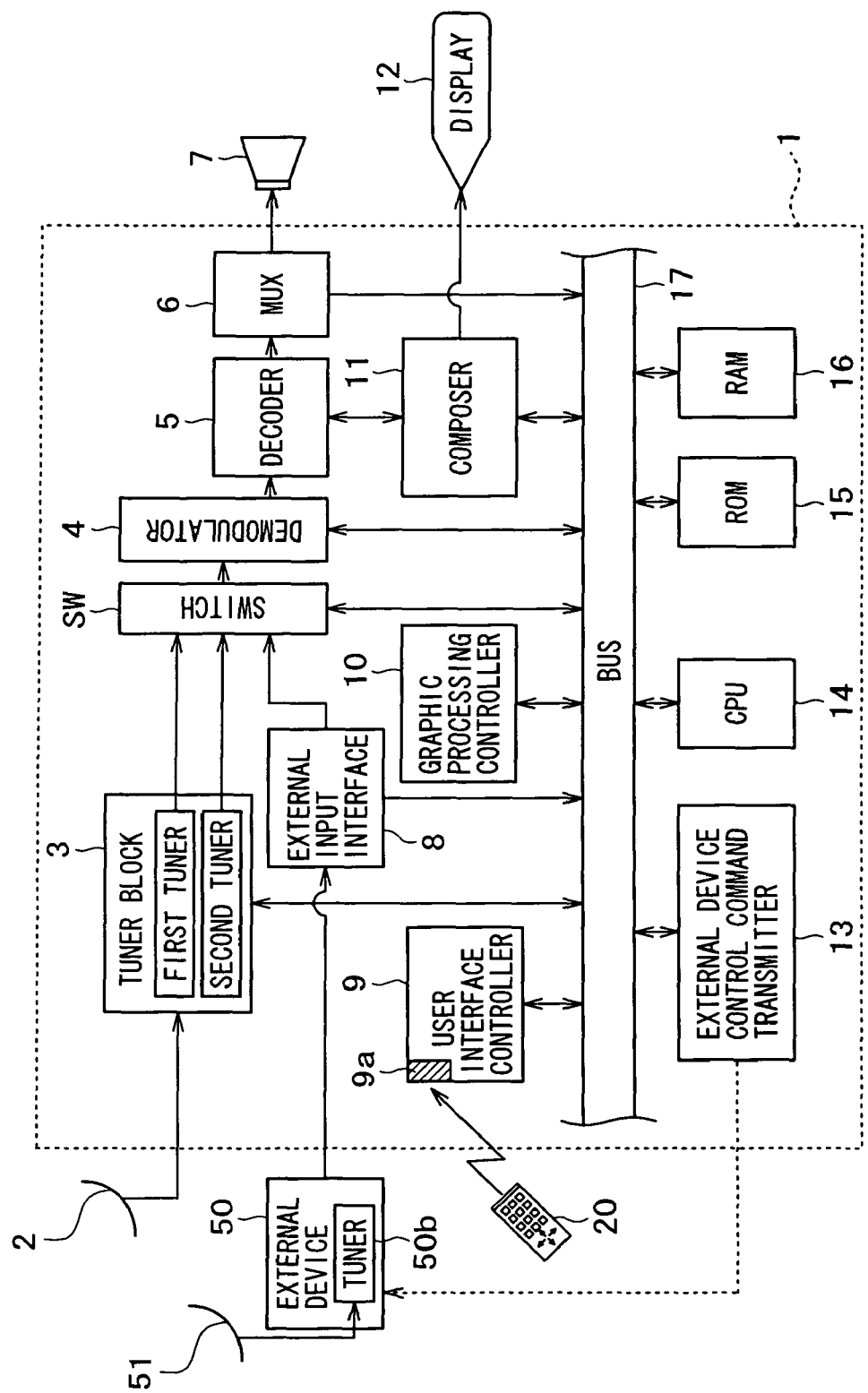
FIG. 1 is a block diagram showing a typical internal structure of a receiving apparatus including a selecting apparatus that embodies this invention.

FIG. 1 is a block diagram showing a typical internal structure of a receiving apparatus 1 including a selecting apparatus that embodies this invention. The selecting apparatus of this embodiment is constituted at least by a switch SW, a user interface (U/I) controller 9, an external device control command transmitter 13, a CPU 14, a ROM 15, a PAM 16, and a remote commander 20 as illustrated.

The receiving apparatus 1 is shown furnished with a tuner block 3 including tuners (first tuner 3a, second tuner 3b) addressing a plurality of broadcast wave categories covering terrestrial wave digital broadcasts and BS digital broadcasts.

The receiving apparatus 1 is further equipped with an external input interface (I/F)) 8 that is connected to an external device 50. The external device 50 has a tuner 50a illustratively for receiving and selecting CS broadcasts that are input to the receiving apparatus 1 through the external input interface 8.

The receiving apparatus 1 is also provided with an external device control command transmitter 13 that may be called an AV mouse. The transmitter 13 is used to give various control commands to the external device 50.

In FIG. 1, an antenna block 2 is assumed to include both a terrestrial wave digital broadcast receiving antenna and a BS digital broadcast receiving antenna. The broadcast waves received by the antenna block 2 are input to the tuner block 3 via a mixer, not shown.

In the tuner block 3, the first tuner 3a receives the terrestrial digital broadcast wave, and the second tuner 3b admits the BS digital broadcast wave. The first and the second tuners 3a and 3b tune in to the received broadcast channels under control of the CPU 14 connected to the tuner block 3 via a bus 17.

It should be noted that the received broadcast waves are not limited to the terrestrial and BS digital broadcast waves; they may include wired broadcast waves and terrestrial analog broadcast waves as well.

The external input interface 8 admits received data over the CS broadcast channel captured by an antenna 51 and selected by the tuner 50a in the external device 50 which, as mentioned above, is a CS broadcast-compliant receiver. The broadcast wave that can be received by the external device 50 is not limited to the CS broadcast wave alone; other broadcast wave categories may be covered by the external device 50 as well.

The switch SW admits output data from the first tuner 3a, second tuner 3b, and external input interface 8. Of the output data coming from these three components, the data from one of them is selected under control of the CPU 14 connected to the switch SW via the bus 17. The output data thus selected is output to a demodulator 4.

The demodulator 4 demodulates the digitally modulated data coming from the switch SW and forwards the demodulated data to a decoder 5. In the case of BS digital broadcasts, the digital data demodulated by the demodulator 4 forms a transport stream wherein AV data compressed by MPEG-2 and data broadcast data are multiplexed. The AV data is made up of video and audio information constituting broadcast content, and the data broadcast data is data attached to the broadcast content (e.g., electronic program guide (EPG) data).

The decoder 5 splits the transport stream from the demodulator 4 into the AV data compressed by MPEG-2 and the data broadcast data. The decoder 5 also separates real-time AV data compressed by MPEG-2 into compressed video data and compressed audio data.

The separated audio data is decoded by PCM (pulse code modulation) criteria and overlaid on any added sounds before being output to speakers 7 through a mixer (MUX) 6. The separated video data is expanded and output to a display 12 via a composer 11.

The speakers 7 output audio signals supplied from the mixer 6. The display 12 displays (i.e., reproduces) video signals fed from the composer 11.

The decoder 5 also sends the data broadcast data separated from the transport stream to the CPU 14 over the bus 17. Given the data, the CPU 14 performs necessary processes by running relevant applications so as to create an EPG table or to provide other features.

The user interface (U/I) controller 9 is a module that processes the user's input operations. Illustratively, when the user operates the remote commander 20 made up of control buttons and/or switches, a corresponding operation signal (IR signal) is emitted by an infrared radiation emitter (not shown) of the commander 20 and received by a radiation receiver 9a of the controller 9. The received signal is converted to an input operation signal in the form of an electrical signal that is output to the CPU 14.

Alternatively, a control panel may be furnished on the enclosure of the apparatus and equipped with operation switches for the user to operate on. The user's operation on the control panel will be detected by the user interface controller 9 which furnishes corresponding operation information to the CPU 14.

A graphic processing controller 10 is a dedicated controller for generating screens under control of the CPU 14. As such, the controller 10 has high-resolution drawing function compatible with SVGA (Super Video Graphic Array) or XGA (extended Graphic Array).

Illustratively, the graphic processing controller 10 renders GUI (Graphical User Interface) operation screens and EPG table screens. The rendering screen data is overlaid on broadcast images by the composer 11 or is switched and output unmodified to the display 12 for viewing by the user.

Under control of the CPU 14, the external device control command transmitter 13 transmits control commands indicating the external device 50 to perform necessary operations. This control command transmitter 13 may be formed integrally with the external input interface 8 inside the same module.

The CPU 14 is a main controller that controls the receiving apparatus 1 as a whole. The CPU 14 carries out diverse applications on a platform provided by its operating system (OS).

Illustratively, the CPU 14 executes controls for switching broadcast channels as well as the terrestrial digital broadcast wave, BS digital broadcast wave, and CS digital broadcast wave on the basis of table information shown in FIGS. 2 through 4, to be discussed later, and in accordance with operation signals entered through the remote commander 20 and user interface controller 9.

Given the operation signals through the remote commander 20 and user interface controller 9, the CPU 14 generates command information for indicating the external device 50 to perform necessary operations such as channel switchover, and causes the generated command information to be forwarded to the external device control command transmitter 13.

The ROM 15 is a read-only memory that accommodates self-diagnostic and initialization programs to be executed upon power-up of the receiving apparatus 1 as well as control codes for use in hardware operations. In particular, the ROM 15 of this embodiment holds programs that bring about processes to be discussed later with reference to FIGS. 6 and 7. The ROM 15 may also store table information (FIGS. 2 through 4) for switching broadcast channels and broadcast wave categories. Preferably, the ROM 15 may contain a rewritable nonvolatile area.

The RAM 16 is a writable volatile memory into which executable programs of the CPU 14 are loaded or to which work data for use with the executable programs is written.

The table information, stored illustratively in the ROM 15 and used for switching broadcast channels and broadcast wave categories, typically has data structures shown in FIGS. 2 through 4. FIGS. 2 and 3 indicate channel setting tables that contain information for setting broadcast channels across different broadcast wave categories. More specifically, FIG. 2 gives a typical channel setting table for setting the broadcast channels in the terrestrial digital broadcast wave category, and FIG. 3 shows a typical channel setting table for setting the broadcast channels in the BS digital broadcast wave category.

In the channel setting tables of FIGS. 2 and 3, the column "display channel" denotes display-ready channel numbers which are set on the receiving apparatus 1 and to which the user may assign broadcast channels as desired. In the example of the terrestrial digital broadcast wave category shown in FIG. 2, 12 channels numbered 1 through 12 are shown established, and the user may assign desired broadcast channels to these channel numbers.

In the channel setting tables of FIGS. 2 and 3, the column "receiving channel" indicates the channel numbers set to correspond with available broadcast channels on a one-to-one basis. In the example of FIG. 2, a receiving channel "1" is shown corresponding to a display channel "1." Illustratively, when the user gives a command to select the display channel No. 1, the correspondence causes the receiving apparatus 1 to select the broadcast channel whose frequency is associated with the receiving channel "1."

In the fields of the "receiving channel" column, a diagonal line indicates the absence of an established receiving channel.

In FIGS. 2 and 3, the column "channel skip" indicates settings specifying whether or not to skip a particular channel. Illustratively, a channel set for "0" in a field of the column "channel skip" is a channel not selected during zapping; a channel set for "1" is a channel selected during zapping. It should be noted that zapping refers to the user's operation of switching channels randomly without any particular channel in mind, especially in ascending or descending order of the channel numbers available.

FIG. 4 shows a typical data structure of the tuner setting table necessary for switching broadcast wave categories. In FIG. 4, the column "tuner ID" indicates ID's assigned in advance to the tuners tuning in to the broadcast waves that can be received by this receiving apparatus 1.

The column "received broadcast wave" contains settings denoting broadcast wave categories received by the tuners that are assigned the tuner ID's in the "tuner ID" column. In the "received broadcast wave" column, "0" is set illustratively to indicate the terrestrial digital broadcast wave that is received; "1" is set to denote the BS digital broadcast wave that is received; and a "2" is set to represent the CS broadcast wave that is received.

In FIG. 4, the column "device" has settings indicating whether each tuner is located inside or outside the receiving apparatus 1. Illustratively, a tuner set for "0" is located inside the receiving apparatus 1; and a tuner set for "1" is located outside.

As with the "channel skip" column in FIGS. 2 and 3, the column "tuner skip" in FIG. 4 has settings specifying whether or not to skip a particular tuner during zapping. Illustratively, a tuner set for "0" in the "tuner skip" column is not subject to zapping. In other words, the broadcast channels received by the tuner set for "0" in the "tuner skip" column are not selected during zapping.

In this example, the tuner having the tuner ID "0" (i.e., tuner 3a for dealing with terrestrial digital broadcasts) is not applicable to the skip in zapping. That is, the broadcast channels received by the tuner 3a are always subject to zapping.

Figure 5:
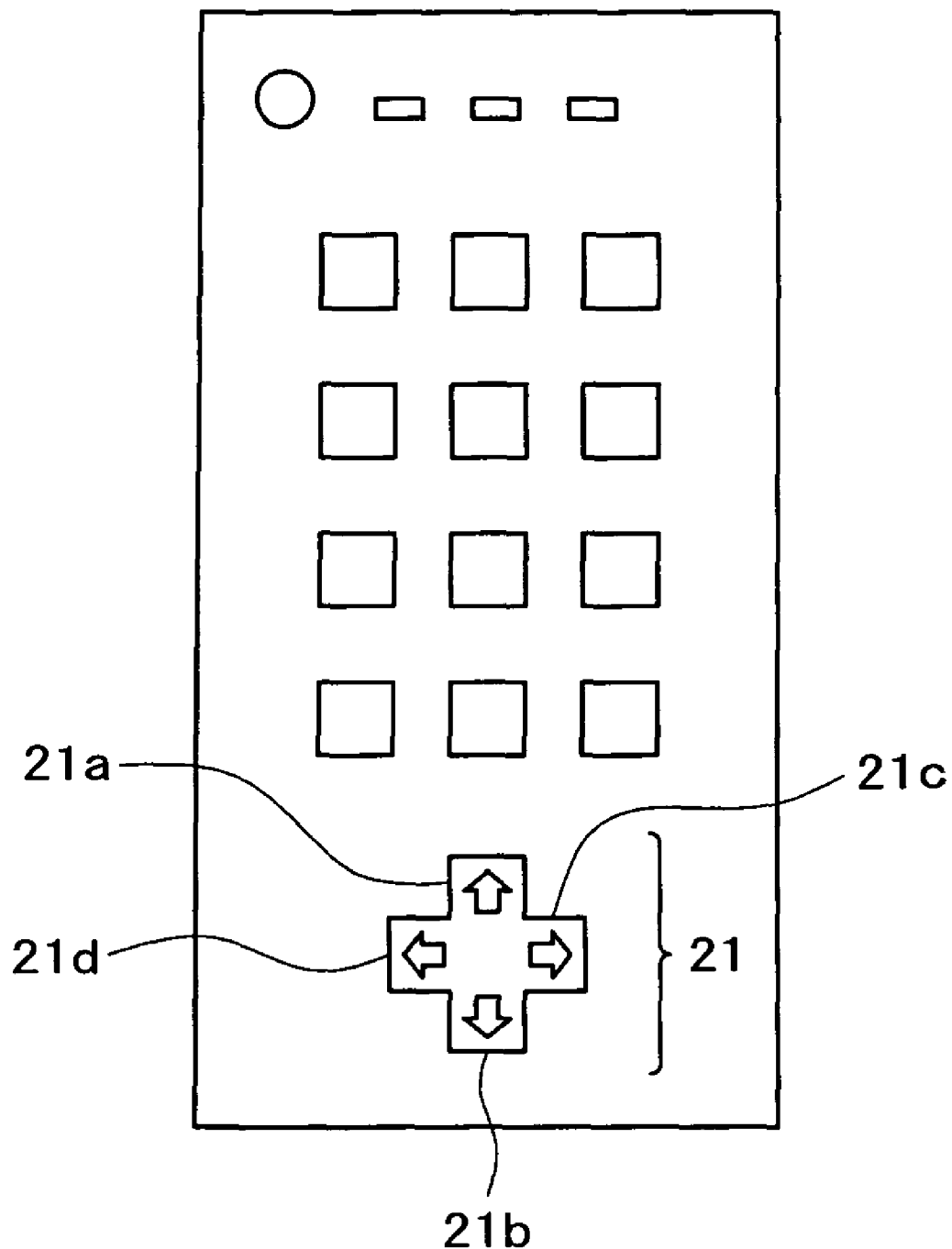
FIG. 5 is an external view of a remote commander furnished for the inventive selecting apparatus.

FIG. 5 is an external view of the remote commander 20 included in FIG. 1. As illustrated, the face of the remote commander 20 has a plurality of operating elements mounted allowing the user to make various input operations on the receiving apparatus 1. Particularly noticeable among the operating elements of the commander 20 is an arrow key 21 operated mainly to give directional commands to the receiving apparatus 1.

The arrow key 21 is made up of four operating elements: an upward operating element 21a, a downward operating element 21b, a rightward operating element 21c, and a leftward operating element 21d as indicated. The four directional operating elements 21a through 21d constitute an integral operating block designed to issue directional commands.

In FIG. 5, the arrow key 21 appears as a single operating element. In this context, however, the arrow key 21 is considered to be formed by the four directional operating elements 21a through 21d. That is, the operating elements are distinguished not by appearance but by type of input operation.

With this embodiment, some of the directional operating elements 21a through 21d are assigned the operation of switching broadcast channels; the other elements are assigned the operation of changing broadcast wave categories.

More specifically, the upward operating element 21a and downward operating element 21b are assigned the operation of switching broadcast channels. In this example, the upward operating element 21a and downward operating element 21b are used to switch display channels in ascending and descending orders of their channel numbers, respectively. On the other hand, the rightward operating element 21c and leftward operating element 21d of the arrow key 21 are used to switch broadcast wave categories.

In the manner described, the switching of channels and the changing of broadcast wave categories are executed using a single integral operating block as the arrow key 21. This arrangement provides a user interface that is appreciably easier to use than before in zapping across different broadcast wave categories.

Figure 6:
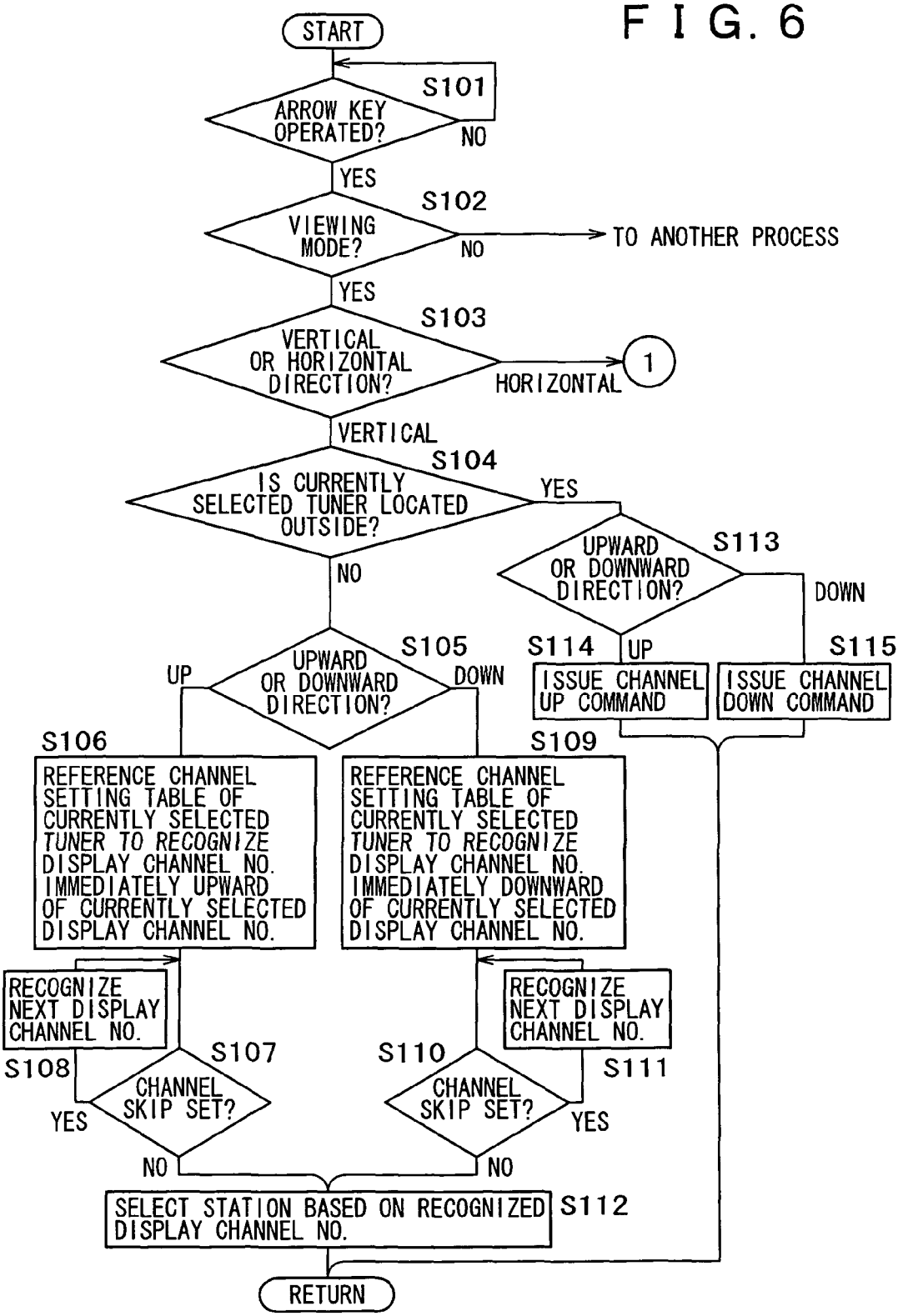
FIG. 6 is a flowchart of steps carried out by the inventive selecting apparatus primarily to switch broadcast channels.
Figure 7:
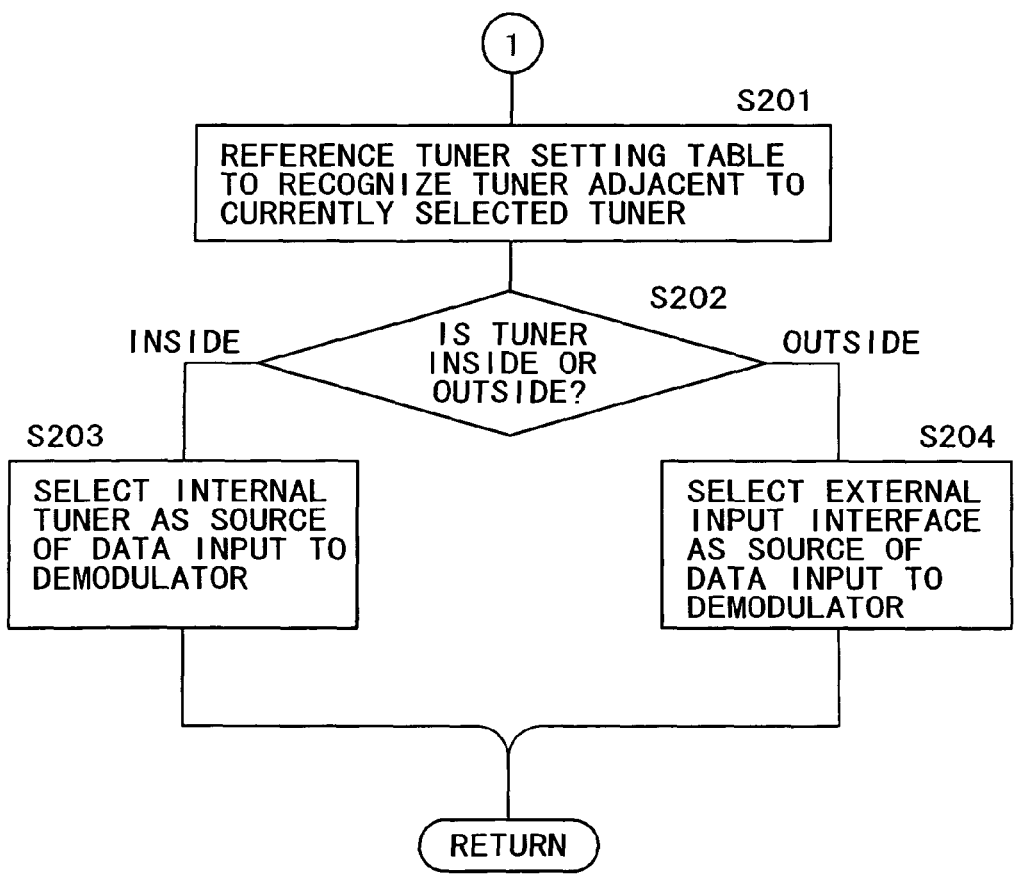
FIG. 7 is a flowchart of steps carried out by the inventive selecting apparatus primarily to switch broadcast wave categories.

FIGS. 6 and 7 are flowcharts of steps to be carried out by the CPU 14 in FIG. 1 to implement the zapping operation with this embodiment. In step S101 of FIG. 6, the CPU 14 monitors continuously to see if the arrow key 21 in FIG. 5 is operated. If any one of the upward operating element 21a, downward operating element 21b, rightward operating element 21c, and leftward operating element 21d is found being operated, the CPU 14 goes to step S102.

In step S102, the CPU 14 determines whether or not viewing mode is in effect. That is, a determination is made to see if the receiving apparatus 1 is causing the received data on the currently selected broadcast channel to appear all over the screen of the display 12.

If the result of the determination in step S102 is negative, i.e., if the receiving apparatus 1 is currently not in its viewing mode, then the CPU 14 proceeds to carry out another process that corresponds to the input operation on the arrow key 21 with regard to the receiving apparatus 1 in its current status. Out of its viewing mode, the receiving apparatus 1 may be displaying an EPG screen, an interface screen on which to make settings, or some other screen. With such a screen on display, the arrow key 21 is interpreted illustratively as been operated to move the cursor.

If the result of the determination in step S102 is affirmative, i.e., if the receiving apparatus 1 is found currently in its viewing mode, then step S103 is reached.

In step S103, a determination is made to determine whether the input operation on the arrow key 21 as detected in step S101 is oriented in the vertical or in the horizontal direction. If the input operation detected in step S101 is found to be performed on the rightward operating element 21c or leftward operating element 21d and thus oriented in the horizontal direction, then control is passed on to step S201 in FIG. 7.

If in step S103 the input operation detected in step S101 is found to be carried out on the upward operating element 21a or downward operating element 21b and thus oriented in the vertical direction, then step S104 is reached.

In step S104, a determination is made to determine whether or not the currently selected tuner is located outside. More specifically, the CPU 14 first recognizes the tuner ID of the tuner currently selected by the switch SW in FIG. 1, the tuner being one of the first tuner 3a, second tuner 3b, and the tuner 50a of the external device 50 indicated in FIG. 1. The CPU 14 then references the tuner setting table in FIG. 4 to verify the setting in the "device" column which corresponds to the recognized tuner ID. The corresponding setting in the "device" column indicates whether or not the currently selected tuner is located outside.

If the result of the determination in step S104 is affirmative, i.e., if the currently selected tuner is located outside, then control is passed on to step S113, to be described later. If in step S104 the currently selected tuner is not found located outside, then step S105 is reached.

In step S105, a determination is made to determine whether the input operation on the arrow key 21 as detected in step S101 is oriented in the upward or in the downward direction. If the input operation detected in step S101 is found being made on the upward operating element 21a, then step S106 is reached. In step S106, the CPU 14 references the channel setting table of the currently selected tuner so as to recognize the display channel number immediately upward of the currently selected display channel number. Since the upward operating element 21a is being operated for upward channel change, the CPU 14 recognizes the display channel number immediately upward of the currently selected display channel number.

In step S107, a determination is made to determine whether or not the recognized display channel number is set for a channel skip. More specifically, in the channel setting table of FIG. 2 or 3, a determination is made to see if, say, a "1" is set in the "channel skip" column for the display channel in question to be skipped.

If the result of the determination in step S107 is affirmative, i.e., if the recognized display channel is found set for a channel skip, then step S108 is reached. In step S108, the CPU 14 recognizes the next display channel number. That is, the display channel number immediately upward of the currently selected display channel number is recognized in the channel setting table.

With the next display channel number thus recognized, step S107 is reached again. In step S107, a determination is again made to determine whether or not the recognized display channel number is set for a channel skip.

If the result of the determination in step S107 is negative, i.e., if the recognized display channel is not found set for a channel skip, then step S112 is reached. In step S112, the CPU 14 controls the relevant components to tune in to the broadcast station based on the recognized display channel number. More specifically, the CPU 14 first recognizes the receiving channel number corresponding to the recognized display channel number in the channel setting table. The CPU 14 then controls the currently selected tuner (i.e., first tuner 3a or second tuner 3b) recognized in step S104 so as to select the broadcast channel whose frequency corresponds to the receiving channel number thus recognized.

With the above steps carried out as described, the upward channel change is executed in response to the input operation being made on the upward operating element 21a of the arrow key 21. At the same time, with steps S107 and S108 carried out, zapping is performed in accordance with the channel skip settings discussed above with reference to FIGS. 2 and 3.

If in step S105 the input operation detected in step S101 is found being made on the downward operating element 21b, then step S109 is reached. In step S109, as in step S106, the CPU 14 references the channel setting table of the currently selected tuner so as to recognize the display channel number next to the currently selected display channel number. Because the downward operating element 21b is being operated on the arrow key 21, the CPU 14 recognizes the display channel number immediately downward of the currently recognized display channel number.

In step S110, as in step S107, a determination is made to determine whether or not the recognized display channel number is set for a channel skip. More specifically, in the channel setting table, a determination is made to see if, say, a "1" is set in the "channel skip" column for the display channel in question to be skipped. If the recognized display channel is found set for a channel skip, then step S111 is reached. In step S111, the CPU 14 recognizes the next display channel number. Because the downward operating element 21b is being operated for downward channel change, the CPU 14 recognizes the display channel number immediately downward, not upward, of the currently recognized display channel number.

With the next display channel number thus recognized, step S111 is reached again. In step S111, a determination is again made whether or not the recognized display channel number is set for a channel skip.

If the result of the determination in step S110 is negative, i.e., if the recognized display channel is not found set for a channel skip, then step S112 is reached. In step S112, the CPU 14 controls the relevant components to tune in to the broadcast station based on the recognized display channel number.

The downward channel change is thus executed in response to the input operation being made on the downward operating element 21*b* of the arrow key 21. At the same time, with steps S110 and S111 carried out, zapping is performed in accordance with the channel skip settings discussed above.

If the result of the determination in step S104 is affirmative, i.e., if the currently selected tuner is located outside, then step S113 is reached. In step S113, as in step S105, a determination is made to determine whether the input operation on the arrow key 21 as detected in step S101 is oriented in the upward or in the downward direction.

If in step S113 the detected input operation is found being made on the upward operating element 21*a*, then step S114 is reached. In step S114, the CPU 14 performs a relevant process to issue a channel up command.

In the case above, the tuner currently selected by the switch SW is the tuner 50*a* of the external device 50 connected via the external input interface 8. With the external tuner in use, the external device control command transmitter 13 under control of the CPU 14 sends a channel up command signal to the external device 50 so that the latter will execute an upward channel change.

If in step S113 the detected input operation is found being made on the downward operating element 21*b*, then step S115 is reached. In step S115, the CPU 14 performs a relevant process to issue a channel down command. In this case, the external device control command transmitter 13 under control of the CPU 14 sends a channel down command signal to the external device 50 so that the latter will execute a downward channel change.

As described, with the external tuner currently selected, a suitable channel change command is transmitted from the external device control command transmitter 13 to the external device 50 for a channel change operation. Either the upward or the downward channel change is executed depending on the input operation being made on the upward operating element 21*a* or on the downward operating element 21*b*.

Described below with reference to FIG. 7 is what takes place in step S201 and subsequent steps to which control is transferred if the input operation detected in step S101 is found being made on the rightward operating element 21*c* or leftward operating element 21*d*.

In step S201 of FIG. 7, the CPU 14 references the tuner setting table in order to recognize the tuner next to the currently selected tuner. That is, the CPU 14 first recognizes the tuner ID of the tuner being selected by the switch SW, and then detects the tuner ID adjacent to the recognized tuner ID in the tuner setting table of FIG. 4.

In step S202, a determination is made to determine whether the currently selected tuner is located inside or outside the receiving apparatus. In step S202, as in step S104 of FIG. 6, the CPU 14 references the corresponding setting in the "device" column of the tuner setting table to determine whether the currently selected tuner is located inside or outside.

If the recognized tuner is found located inside, then step S203 is reached. In step S203, the CPU 14 performs a suitable process to set the recognized internal tuner as the data input source to the demodulator 4.

In that case, the recognized tuner is either the first tuner 3*a* or second tuner 3*b* located inside the receiving apparatus. The switch SW is then controlled in such a manner as to let the received data be input from the tuner corresponding to the recognized tuner ID.

If in step S202 the recognized tuner is found to be located outside, then step S204 is reached. In step S204, the CPU 14 performs a necessary process to set the external input interface 8 as the data input source to the demodulator 4. More specifically, the CPU 14 controls the switch SW to select the data coming from the external input interface 8 in order to admit the input data over the broadcast channel received selectively by the tuner 50*a* of the external device 50.

As described, if the input operation performed on the arrow key 21 was found oriented in the horizontal direction in step S103 of FIG. 6, then the switch SW is controlled in step S203 or S204 to change broadcast wave categories. That is, the broadcast wave categories are switched by operating the rightward operating element 21*c* or leftward operating element 21*d* of the arrow key 21.

In that case, with step S203 or S204 carried out, the last channel in effect following the broadcast wave category switch is displayed. Illustratively, steps S203 and S204 may each be followed by an appropriate process for channel switching whereby a predetermined channel may be selected by the tuner following the switch.

With this embodiment, as described, the input operation on the upward operating element 21*a* or downward operating element 21*b* of the arrow key 21 effects the changing of channels in the same broadcast wave category. The input operation on the rightward operating element 21*c* or leftward operating element 21*d* of the arrow key 21 brings about the switch of broadcast wave categories. When it is possible to switch both the channels and the broadcast wave categories by operating the single integral operating block alone (i.e., arrow key 21), this feature provides a user interface that is significantly easier to use than ever during zapping across different broadcast wave categories.

When zapping of the above type specific to this embodiment is carried out, broadcast wave categories can be changed without going through the entire range of broadcast channels within the same broadcast wave category. That means there is no need to change unnecessary channels preparatory to switching from the current broadcast wave category over to another category. This makes it possible to lower the number of zapping operations to be performed across different broadcast wave categories.

This embodiment is equipped with the external device control command transmitter 13 that allows input operations on the receiving apparatus 1 to be reflected on the external device 50. This feature makes it easy to carry out zapping across an extensive selection of broadcast wave categories including the wave received by the external device 50.

If zapping across the different broadcast wave categories including the one received by the connected external device 50 were to be carried out without recourse to the external device control command transmitter 13, the procedure involved would be much more complicated: first it is necessary to switch to the data input from the external device 50. Once the external device 50 is selected, more operations need to be performed to change channels on the external device 50.

By contrast, with the external device control command transmitter 13 in use, zapping across the broadcast waves including the one received by the external device 50 is achieved by operating the arrow key 21 alone. The procedure is far easier to accomplish with the external device control command transmitter 13 than without it.

Although the arrow key 21 was indicated as the preferred operating block for zapping in the foregoing description, this is not limitative of the invention. Alternatively, a so-called joystick or other suitable directional operating block may be adopted instead.

Apart from the above-described single operating block that is integral by itself in appearance, it is also possible to assign mutually related operations to a plurality of discrete operating elements so that these elements may be used in combination to function as a single operating block.

In the foregoing description, the arrow key 21 was shown mounted on the remote commander 20. Alternatively, if similar operating elements are furnished on the control panel of the enclosure housing the receiving apparatus 1, input operations performed on these elements may also be interpreted as the operations for executing the steps in FIGS. 6 and 7, whereby zapping of this embodiment may be carried out.

Although the embodiment above was shown assigning the operations for ordering the switching of channels and broadcast wave categories to the directionally oriented operating elements, this is not limitative of the invention. It is not mandatory to assign all of these operations to the directional elements.

Illustratively, another operating element may be provided in the middle of the upward, downward, rightward and leftward operating elements on the operating block. The centrally positioned operating element, used illustratively to make a finalizing operation, may also serve to switch the broadcast wave categories while the upward and downward operating elements are used to change the channels. In other words, the operations for switching the channels and broadcast wave categories need not be assigned solely to the directional operating elements.

Although the operations for switching the channels and broadcast wave categories were shown assigned to the physically discrete operating elements in the foregoing description, this is not limitative of the invention. Alternatively, some of the operations may be taken over by a common operating element. Illustratively, holding the upward operating element 21a down longer than a predetermined time period may be interpreted as the operation to switch the broadcast wave categories. That is, in addition to its initially assigned operation of switching the channels, the same physical operating element may take on the operation of changing the broadcast wave categories.

The embodiment above was shown switching television channels and TV broadcast wave categories coming from the internal tuners of the receiving apparatus 1 as well as from an externally connected tuner. Alternatively, another embodiment of the invention may be practiced to switch input sources other than the TV broadcast waves and to change content data within each of these input sources.

Illustratively, content data input from servers connected to the receiving apparatus 1 over a network may be received and switched selectively by the apparatus 1 for data reproduction on a streaming basis. In such a case, the arrow key 21 may be operated to select the input data from the connected servers as well as to switch the above-mentioned content data.

As another alternative, a hard disk drive (HDD) attached internally or externally to the receiving apparatus 1 may be used to accommodate content data for selective reproduction. In this example, the arrow key 21 may be operated to select the input data retrieved from the hard disk drive as well as to switch the above-described content data.

That is, the expression "sources" in the context of this invention refers not only to TV broadcast stations but also to a wide range of content data sources, suppliers and providers.

As many apparently different embodiments of this invention may be made without departing from the spirit and scope thereof, it is to be understood that the invention is not limited to the specific embodiments thereof except as defined in the appended claims.

What is claimed is:

1. A selecting apparatus comprising:
    a selecting unit configured to select an input source from a plurality of sources;
    a switching unit configured to switch from a previous content data in the input source to a new content data in the input source;
    a storing unit configured to store a first data and a second data, said first data specifying whether or not to skip one or more of the plurality of sources and said second data specifying whether or not to skip one or more of the new content data in each of the plurality of sources, the first data being distinct from the second data; and
    a controlling unit configured to,
        determine, based only on the first data, whether to skip the input source in response to the input source being selected by the selecting unit, and
        determine, based only on the second data, whether to skip the new content data in response to the new content data being switched by the switching unit.

2. The selecting apparatus according to claim 1, further comprising:
    an operating unit including an arrow key designed to give directional commands in at least upward, downward, leftward, and rightward directions,
    wherein said controlling unit is further configured to
        determine whether to skip the input source in response to directional commands in the rightward and leftward directions and
        determine whether to skip from the previous content data in the input source to the new content data in the input source in response to directional commands in the upward and downward directions.

3. The selecting apparatus according to claim 1, wherein said plurality of sources includes a plurality of categories of broadcast waves representative of different television broadcasts and said content data is formed by broadcast data from each of a plurality of television broadcast channels.

4. The selecting apparatus according to claim 1, further comprising:
    a determining unit configured to determine whether or not the input source selected by said selecting unit is an external device; and
    an outputting unit configured to output control signals for controlling said external device when the selected input source is found to be an external device.

5. A selecting method comprising the steps of:
    selecting an input source from a plurality of sources;
    switching from a previous content data in the input source to a new content data in the input source;
    specifying whether or not to skip one or more of the plurality of sources using a first data;
    specifying whether or not to skip one or more of the new content data in each of the plurality of sources using a second data;
    determining, based only on the first data, whether to skip the input source in response to the input source being selected in the selecting step; and
    determining, based only on the second data, whether to skip the new content data in response to the new content data being switched in the switching step, the first data being distinct from the second data.

6. The selecting method according to claim 5, wherein said specifying steps further include using an arrow key designed to give directional commands in at least upward, downward, leftward, and rightward directions;

said determining, based only on the first data, determines whether to skip the input source in response to directional commands in the rightward and leftward directions; and said determining, based only on the second data, determines whether to skip from the previous content data in the input source to the new content data in the input source in response to directional commands in the upward and downward directions.

7. The selecting method according to claim 5, wherein said plurality of sources includes a plurality of categories of broadcast waves representative of different television broadcasts and said content data is formed by broadcast data from each of a plurality of television broadcast channels.

8. The selecting method according to claim 5, further comprising the steps of:

determining whether or not the input source selected in said selecting step is an external device; and outputting control signals for controlling said external device when the selected input source is found to be an external device.

9. The selecting apparatus according to claim 1, wherein the input source is selected by the selecting unit based on a command from the switching unit.

10. The selecting method according to claim 5, further comprising selecting the input source based on the switching from the previous content data to the new content data.

11. The selecting apparatus according to claim 1, wherein skipping one or more new content data includes omitting the one or more new content data by jumping from the previous content data to a next new content data.

12. The selecting method according to claim 5, wherein skipping one or more new content data includes omitting the one or more new content data by jumping from the previous content data to a next new content data.

* * * * *